(No Model.) 10 Sheets—Sheet 1.

W. T. HARRIS.
CORN HARVESTER.

No. 559,777. Patented May 5, 1896.

Witnesses
A. L. Hobby
J. F. Barthel

Inventor
William T. Harris
By Thos. S. Sprague & Son
Attys.

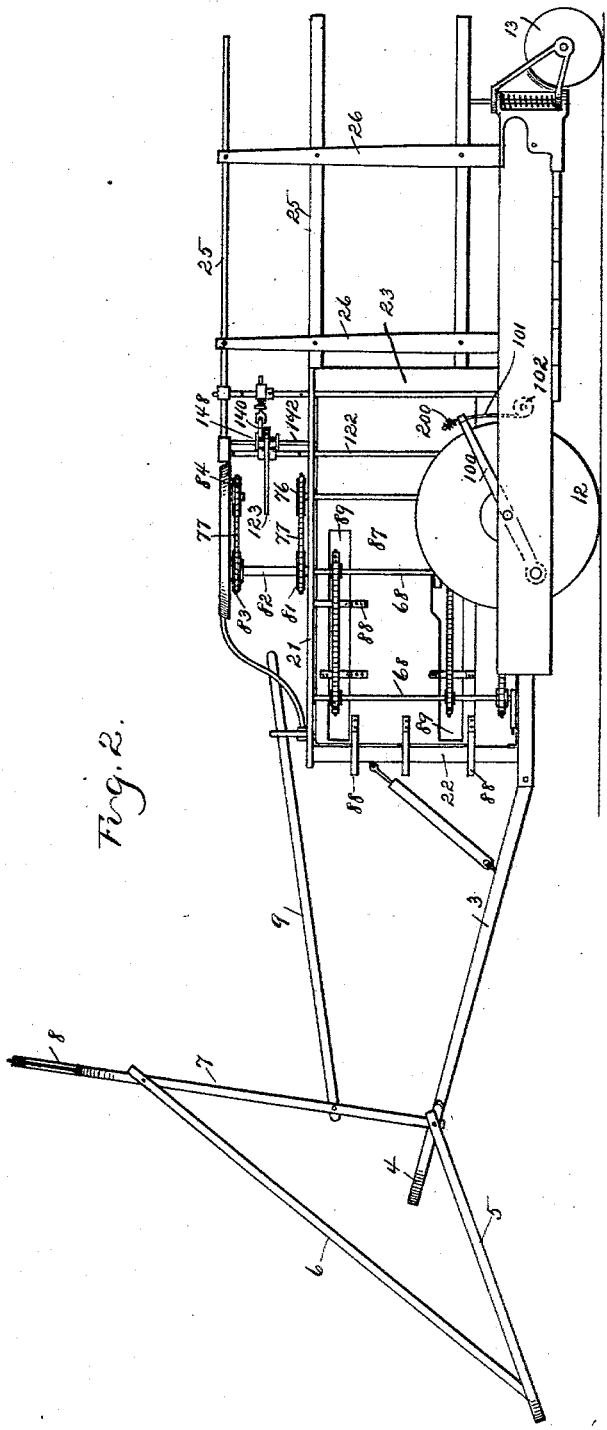

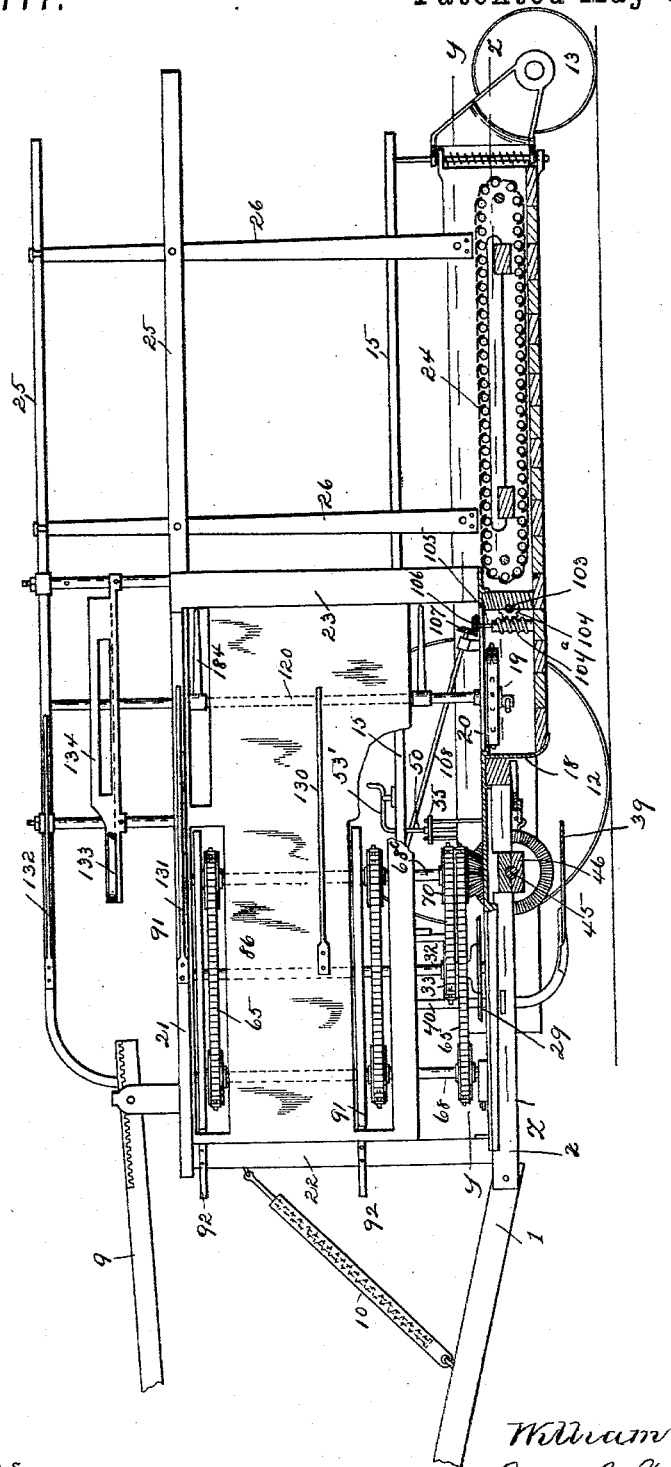

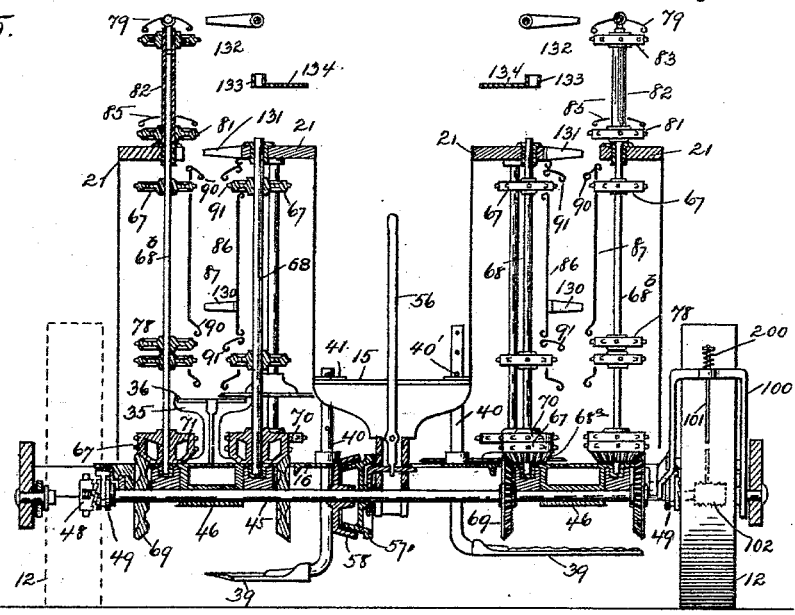

(No Model.)

W. T. HARRIS.
CORN HARVESTER.

No. 559,777.

10 Sheets—Sheet 5.

Patented May 5, 1896.

Witnesses
A. L. Habby
O. F. Bartlett

Inventor
William T. Harris
By Thos. S. Sprague & Son
Attys.

(No Model.) 10 Sheets—Sheet 6.

W. T. HARRIS.
CORN HARVESTER.

No. 559,777. Patented May 5, 1896.

Witnesses
A. L. Habby
O. F. Barthel

Inventor
William T. Harris
By Thos. S. Sprague & Son
Attys (No Model.)  
W. T. HARRIS.  
CORN HARVESTER.  
10 Sheets—Sheet 7.

No. 559,777.  Patented May 5, 1896.

Witnesses  
A. L. Hobby  
O. F. Barthel

Inventor  
William T. Harris  
By Wm. S. Sprague
Atty's (No Model.)　　　　　　W. T. HARRIS.　　　　10 Sheets—Sheet 8.
CORN HARVESTER.

No. 559,777.　　　　　　　　　　　Patented May 5, 1896.

Witnesses

Inventor
William T. Harris.
By Mr. S. Sprague Atty's.

(No Model.) 10 Sheets—Sheet 9.

W. T. HARRIS.
CORN HARVESTER.

No. 559,777. Patented May 5, 1896.

Witnesses

Inventor
William T. Harris
By Thos. S. Sprague & Son
Attys.

(No Model.) 10 Sheets—Sheet 10.

W. T. HARRIS.
CORN HARVESTER.

No. 559,777. Patented May 5, 1896.

Witnesses

Inventor
William T. Harris
By Attys.

UNITED STATES PATENT OFFICE.

WILLIAM T. HARRIS, OF DEFIANCE, OHIO, ASSIGNOR TO CHARLES E. SLOCUM, OF SAME PLACE.

CORN-HARVESTER.

SPECIFICATION forming part of Letters Patent No. 559,777, dated May 5, 1896.

Application filed May 11, 1894. Serial No. 510,857. (No model.)

*To all whom it may concern:*

Be it known that I, WILLIAM T. HARRIS, a citizen of the United States, residing at Defiance, in the county of Defiance and State of Ohio, have invented certain new and useful Improvements in Corn-Harvesters, of which the following is a specification, reference being had therein to the accompanying drawings.

This invention refers to a double harvester intended to cut two rows of corn at the same time, gathering the cut stalks and binding them into bundles, placing the bundles into position on the machine to be bound into shocks, and then automatically ejecting them.

The invention consists in the improved construction and arrangement of the appliances heretofore shown and described in my former patent, No. 532,781, dated January 22, 1895, in connection with a single harvester, and, further, in the construction and arrangement of an automatic binding mechanism, all as more fully hereinafter described.

Figure 1:
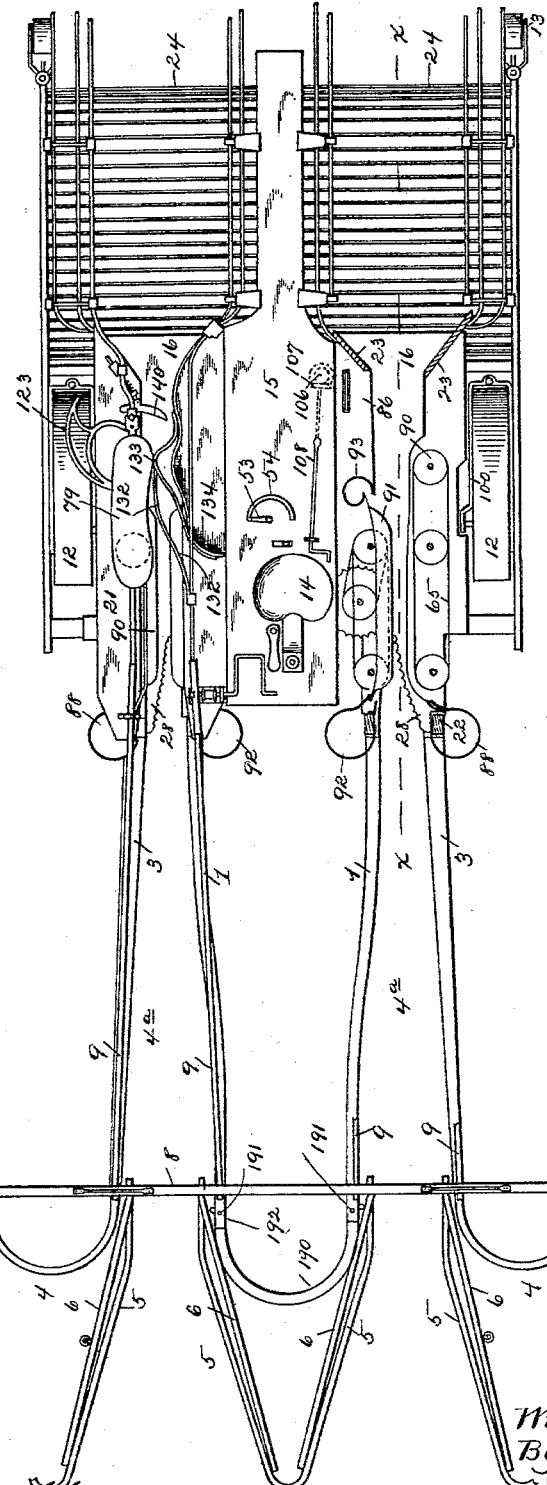
Figure 6:
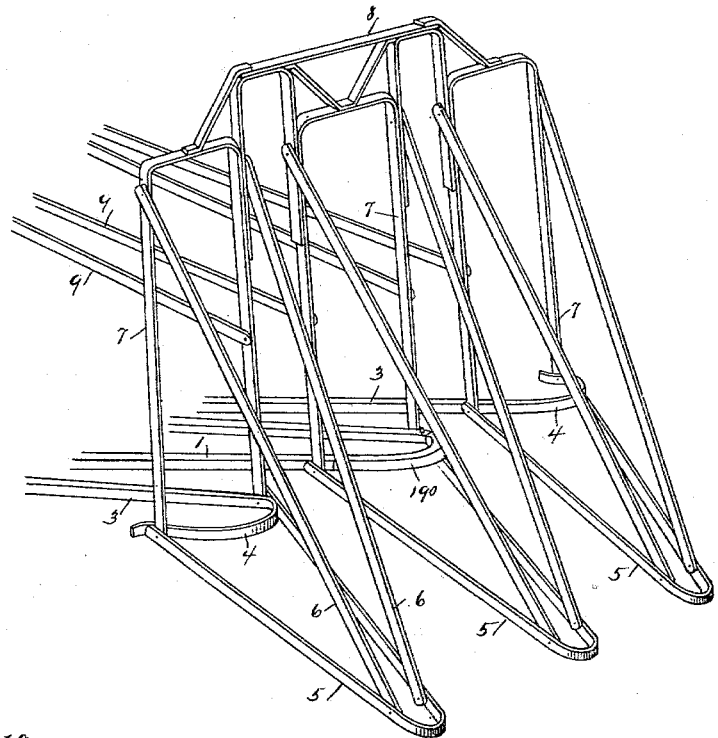
Figure 18:
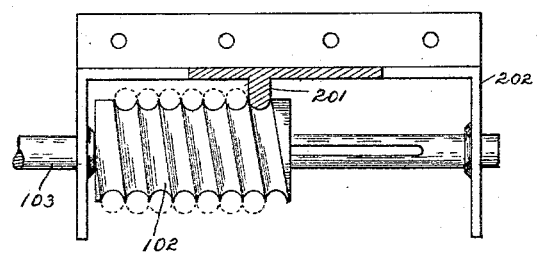
Figure 7:
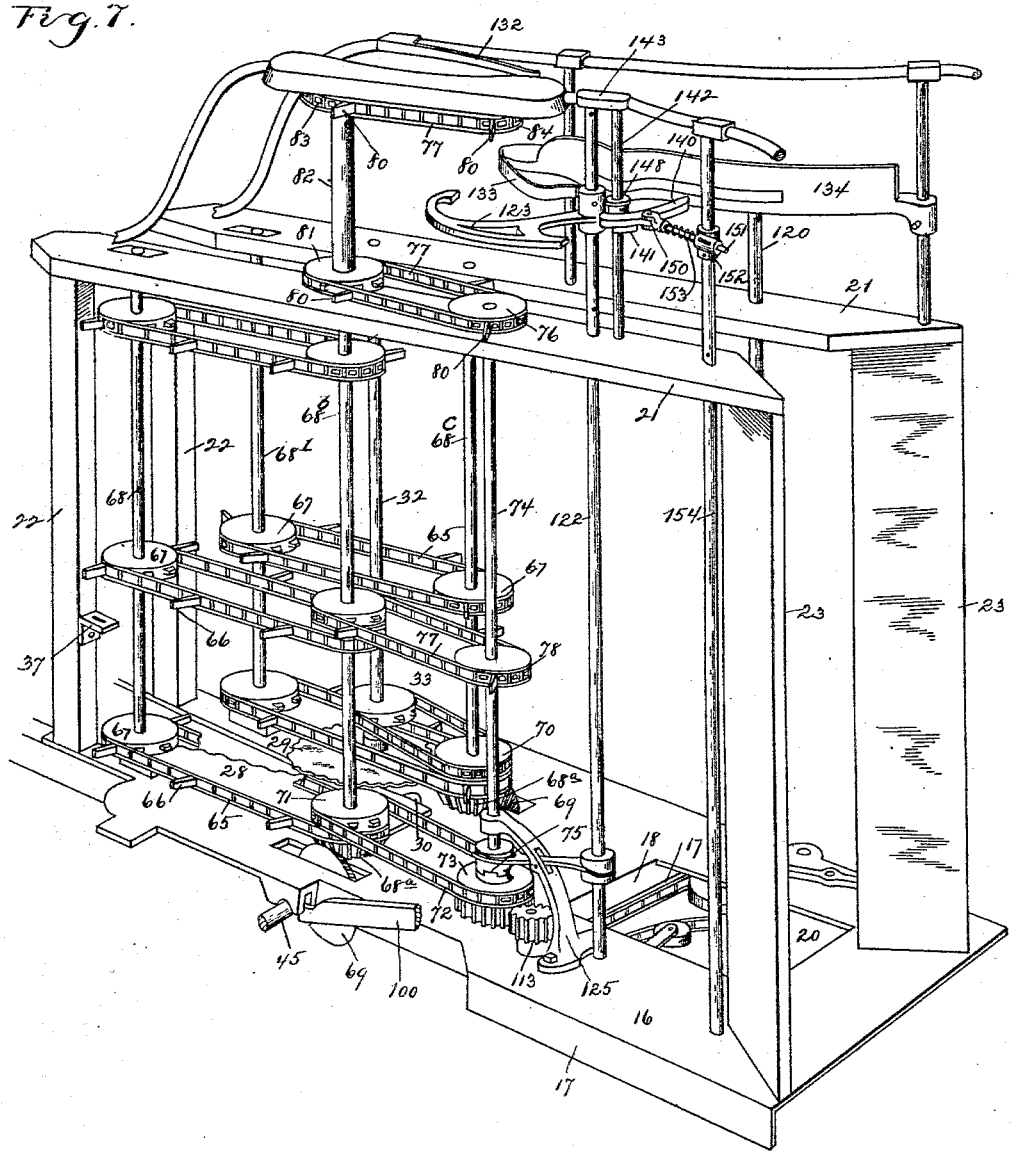
Figure 15:
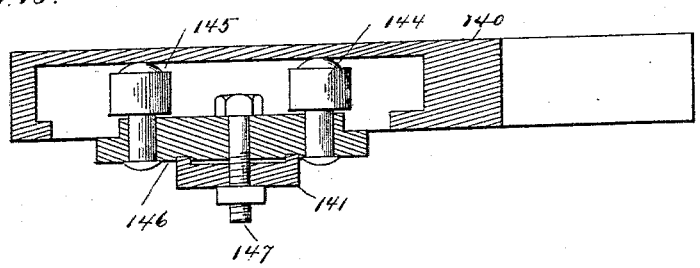
Figure 8:
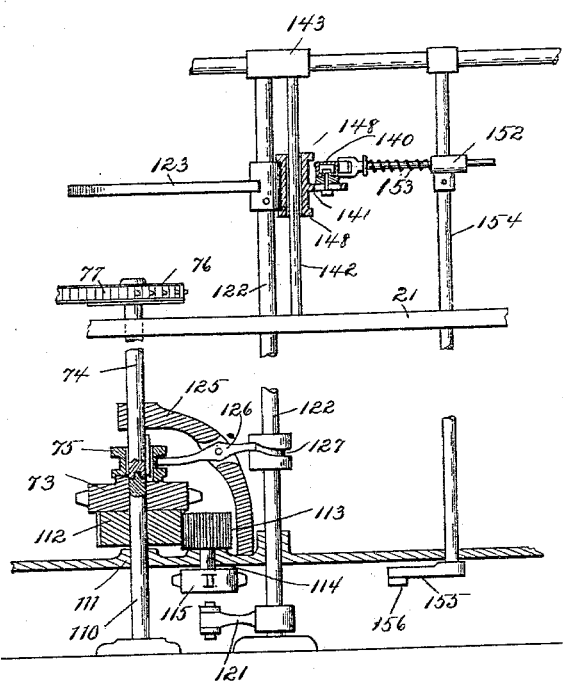
Figure 9:
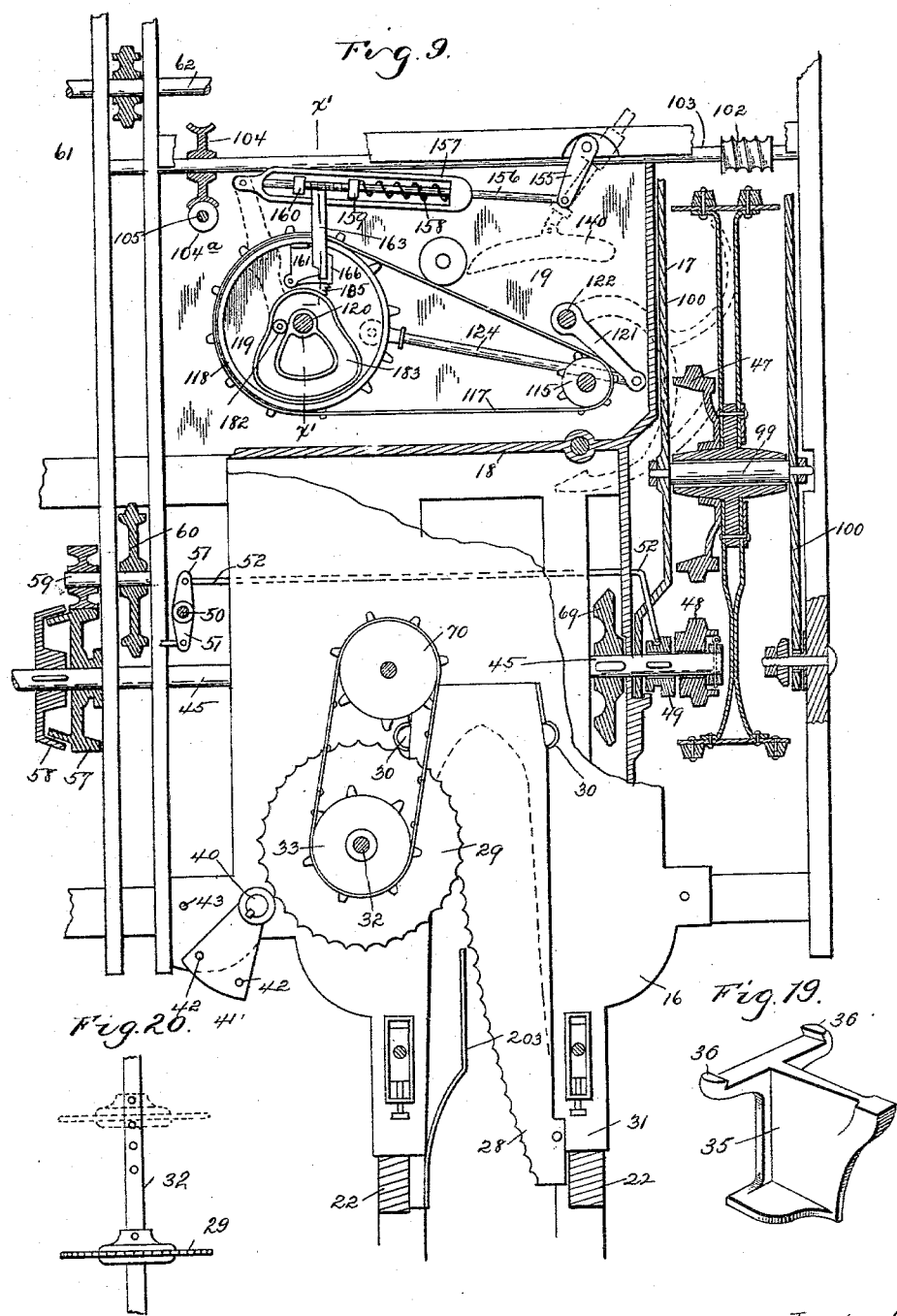
Figure 10:
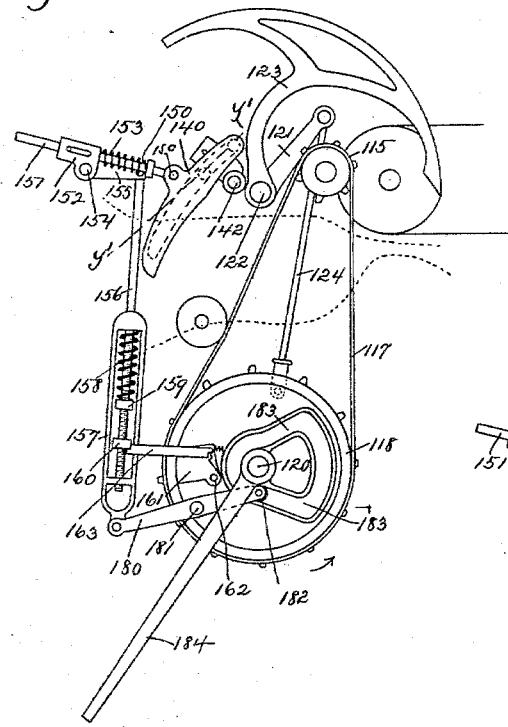
Figure 11:
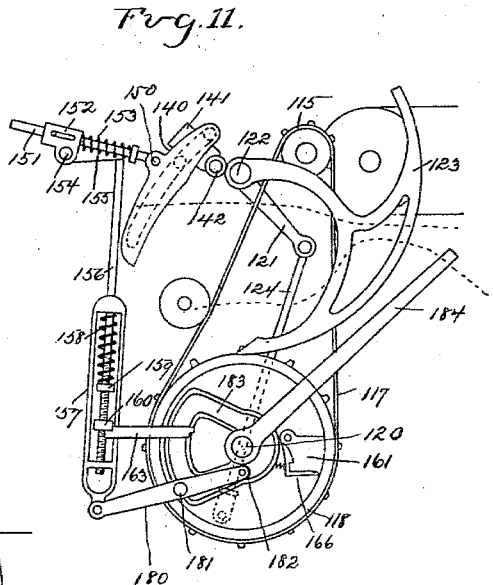
Figure 12:
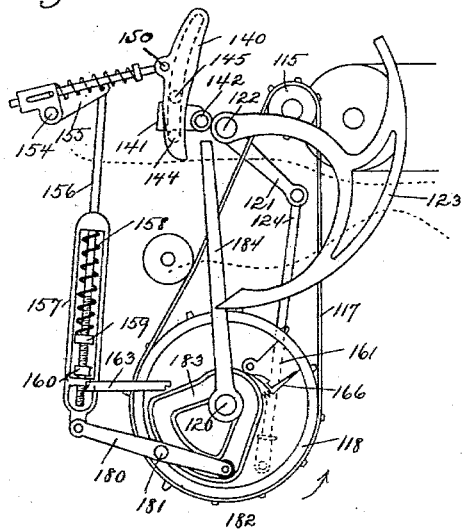
Figure 13:
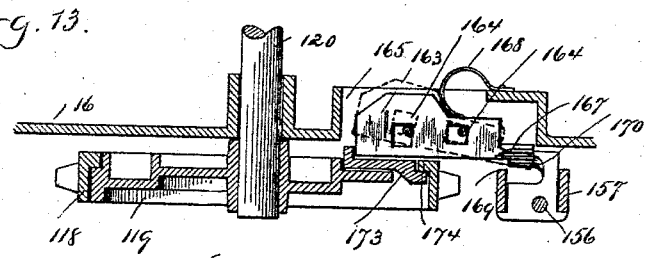
Figure 14:
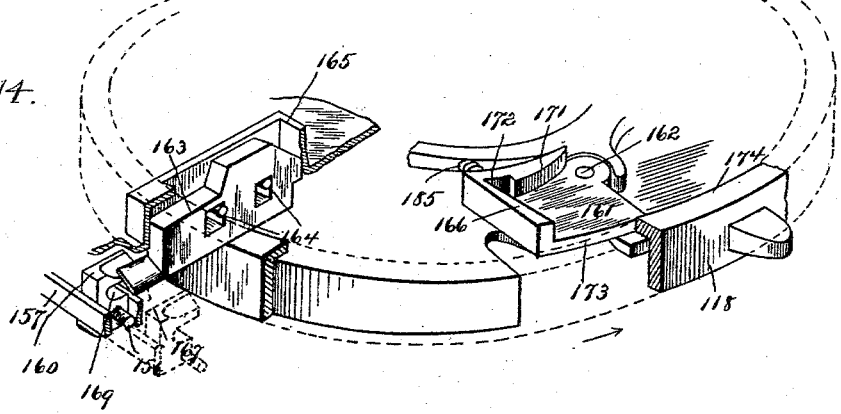
Figure 17:
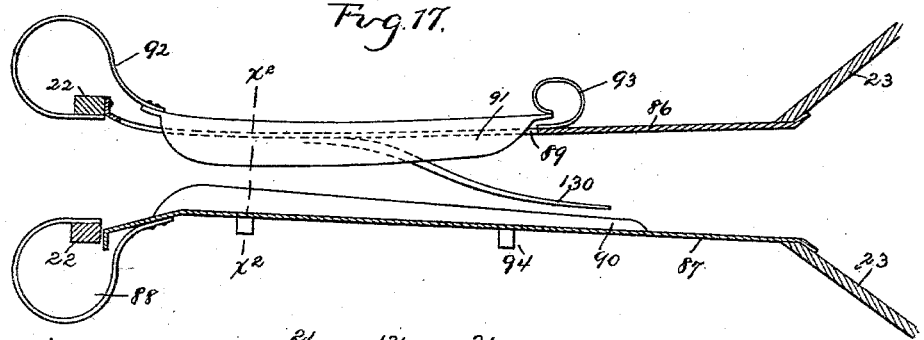
Figure 16:
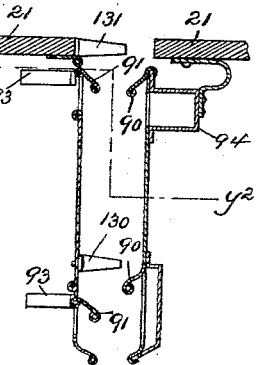

Figure 1 is a general plan of the harvester with the superstructure on one half thereof in horizontal section. Fig. 2 is a side elevation with the outside covering of the carrier mechanism omitted. Fig. 3 is a vertical longitudinal section on line $x\,x$, Fig. 1. Fig. 4 is another plan with the superstructure removed, one half showing the parts in a horizontal plan substantially on line $y\,y$ and the other half substantially on line $z\,z$, Fig. 3. Fig. 5 is a vertical cross-section substantially on a line taken through the main drive-shaft. Fig. 6 is a detached perspective view of the draft connections and the path-clearing devices connected thereto. Fig. 7 is a detached perspective view of the superstructure on the bed-plate of one half of the machine with the flexible aprons omitted. Fig. 8 is a sectional detail showing the actuating-gear connection of the shaft actuating the packer mechanism and the device for throwing it in and out of gear. Fig. 9 represents, substantially, a portion of Fig. 4, showing the parts more in detail on a larger scale and the latch member in diagram to indicate its position. Figs. 10, 11, and 12 are diagram plans of the binder mechanism at different stages of its operation. Fig. 13 is a vertical cross-section on line $x'\,x'$, Fig. 9. Fig. 14 is a detail perspective view of a part of the tripping device in the binding mechanism. Fig. 15 is a vertical cross-section on line $y'\,y'$ in Fig. 10. Fig. 16 is a vertical cross-section of aprons on line $x^2\,x^2$, Fig. 17. Fig. 17 is a horizontal section of aprons on line $y^2\,y^2$, Fig. 16. Fig. 18 is a detail elevation of the winding-drum used in raising and lowering the frame. Fig. 19 is a perspective view of the pedestal, and Fig. 20 is a detail view of the cutting-disk and adjustable supporting means therefor.

The harvester is drawn by three horses abreast. The middle horse works between a pair of shafts 1 1, (see Figs. 1, 4, and 6,) which are united in front and at their rear ends, hinged by suitable shaft-couplings to hounds 2 2, which project forward from the frame. For attaching the horse more conveniently between the shafts 1 1 they are united by the bent piece 190, removably secured by pins 191 in sockets 192, secured to the ends of the shafts. The horses on the right and left work on the outside of similar shafts 3 3, which are similarly connected to hounds 2 and have their front ends provided with return-bends 4, which pass around the horse's breast. All the shafts are set at an angle to the line of draft and at such distances apart as to form between them the V-shaped guideways $4^a$ for two rows of corn. The shafts support the path-clearing fenders, which are arranged as follows: Bars 5 5 5 bent in the form of a V are pivotally secured to the shafts, one in front of each horse. The forward ends of these bars are supported free of the ground by means of the fender-bars 6, from bow-frames 7 7 7, which are pivotally secured to the shafts, one over each horse and which are united into a single frame above the height of the growing corn by intermediate bars and braces 8, so as to leave clear openings for the standing corn into the spaces between the shafts.

The bow-shaped frames 7 are held in upright position by means of the connecting-bars 9, which extend rearwardly to the frame of the harvester in line with the shafts to assist in guiding the cornstalks to the harvester. Their rear ends are preferably adjustably connected to the harvester-frame in any suitable manner to permit of raising or lowering the fenders. The weight of the shafts and fender attachment is borne by the middle horse, which, in supporting the shafts 11 by means of the usual shaft-loops from the gig-saddle, also supports the outer shafts by means of the bow-frames. The middle horse is thus depended upon to guide the machine and lead the other horses. To ease the weight, however, upon the middle horse, suitable shaft-supporting springs 10, which are preferably incased in a sheath, are connected between the front upright of the frame and the shafts.

The draft is applied through a three-horse evener 11, pivotally secured to the frame back of the cutting mechanism, as shown in Fig. 4. The main frame of the harvester forms a horizontal rectangular box-frame, supported near the front end on two large ground-wheels 12 and on the rear end on two caster-wheels 13. The driver is provided with a suitable seat 14, placed on the front end of a raised foot-board 15, Figs. 1 and 3, supported in the longitudinal center of the frame.

On the front part of the frame on each side of the longitudinal center line is secured an iron bed-plate 16, provided with a V-shaped excision between the hounds. The bed-plates form a structural part of the frame and are provided on the under side with vertical flanges 17 and 18, the former of which form the sides of the well 19, in which a part of the binder mechanism is inclosed below the bed-plate, and to which access is provided through an opening 20 in the bed-plate.

Above each bed-plate the frame carries a superstructure consisting of two top plates 21, (see Figs. 3 and 7,) each supported by an upright 22, secured upon the front end of one of the hounds, and in rear by an upright 23, from the bed-plate below.

In rear of each bed-plate an endless traveling platform 24 is mounted in the frame, and each is inclosed upon the sides by a rack formed of horizontal bars 25, supported by suitable uprights 26 from the frame. The topmost of the side bars of each rack extends forwardly over the top boards 21 of the superstructure to form guide-rails for the corn in passing through the throat between said top boards.

As the mechanism for harvesting each of two rows of corn is the same on both sides of the longitudinal center of the frame, except as to the devices under control of the driver, which are common to both, the further description will specifically refer to one side only.

The cutting apparatus (see Fig. 9) consists of a fixed cutting-blade 28 and a revolving cutting-disk 29, both having scalloped cutting edges, which on the blade extend obliquely across the excision of the bed-plate. The fixed cutting-blade is supported immediately upon the bed-plate, its rear end being removably held in position by engaging between lugs 30, formed upon the bed-plate, while the front end is bolted at 31 to a forward extension of the bed-plate. The cutting-disk is adjustably secured upon a vertical shaft 32 (see Fig. 20) by means of a removable pin passing through an aperture in the hub and through suitable apertures in the shaft. The shaft 32 is provided with a sprocket-wheel 33, by means of which it is revolved by suitable connections, as hereinafter more fully described. The cutter-blade may also be adjusted vertically by placing the blade upon a pedestal 35, Fig. 19. This pedestal is secured in place after first removing the cutter-blade by engaging its base between the lugs 30, Fig. 4, on the bed-plate, and is provided on its upper face with the flange 36, having inclined inner faces adapted to engage the sides of the cutter-blade and hold the blade firmly in position. The front end of the cutting-blade may be supported at the required height on a suitable bracket 37, Fig. 7, secured to the upright 22. The cutting-disk being adjustably secured upon the shaft 32 is easily readjusted to the desired height. I preferably employ a spring 203, secured opposite the stationary blade, to force the corn against that blade. (Shown in Fig. 9.) A device is also provided for cutting the stubble, which consists of a knife-blade 39, Figs. 4, 5, and 9, attached at its forward end to an elbow formed on the lower end of a vertical standard 40, which passes upwardly through the frame, the bed-plate, and the foot-board.

The standards 40 are vertically adjustable by having a series of lateral perforations therein through which pins 40' pass, the pins lying on or engaging the upper face of the arms 41. (See Fig. 5.)

The knife-blades 39 are laterally adjustable, so as to change the oblique position of the same relative to the path of the stubble by securing to the standards 40 the segmental arms 41, which rest on the upper face of the bed-plate. These arms 41 are provided with holes 42, which are adapted to register with holes 43, formed in the bed-plate. The parts are preferably locked together by a wooden pin passing through one of the holes 42 and one of the holes 43. By using the wooden pins the same will break when excessive pressure is brought on the blades 39, and thus allow the blades to swing or give way to the pressure, which otherwise would have a tendency to bend or break them.

Below the bed-plate is journaled transversely of the frame the main drive-shaft 45, Figs. 4, 5, and 9, which runs in bearings 46, Fig. 5, depending from the under side of the bed-plate. This shaft receives its motion from the ground-wheels 12 of the harvester by a chain passing around a sprocket-wheel 47, carried by the ground-wheel and sprocket-wheel 48 on the main drive-shaft, Fig. 9. The sprocket-wheel 48 forms the loose member of a clutch, of which 49 is the fast member and which slides on a feather on the drive-shaft and is under control of the driver through a vertical rock-shaft 50, Figs. 3 and 9, which carries at its upper end a handle 53, within reach of the driver, and below the bed-plate two rock-arms 51, into which the inner end of the connecting-rods 52 are hooked, while their outer ends are bent at an angle and engage with the sliding member of the clutch at the opposite ends of the drive-shaft, so that both are thrown in or out of gear simultaneously. At the same time the angular bend gives each connecting-rod sufficient spring to allow the clutch to yield if one wheel travels faster than the other in turning, Fig. 9.

The handle 53, Fig. 1, is held in its adjusted position by means of the half-circle 54, which is provided with suitable locking-notches for the handle to engage in, a half-turn of the handle being only required to throw the main shaft fully in and out of gear, and the connecting-rods 52 interlock with the arms 51.

The endless traveling platforms 24 are driven from the main shaft, under the control of the driver, through a lever 56, Fig. 5, which controls the sliding member 57 of a friction-clutch, the other member 58 of which is fast on the drive-shaft. The member 57 gears into a pinion 59, which revolves the sprocket-wheel 60. The latter in turn gives motion through a sprocket-chain to a sprocket-wheel 61 on a shaft 62, which extends laterally across the whole width of the frame and carries both platforms through suitable sprocket-wheels 63, the rear ends of the platforms being carried by corresponding sprocket-wheels on idler-shafts 64, Fig. 4. The main shaft also imparts motion to the carrier devices, which consists of link-belt chains 65, Figs. 3, 5, and 7, provided with carrier-teeth 66 at suitable intervals. They are arranged in two sets, placed opposite each other and extending alongside the cutting-off device, so as to carry the cornstalks between them while they are being cut off. Each set is carried on sprocket-wheels 67, mounted upon shafts 68, 68', 68$^b$, and 68$^c$, which are journaled at their lower ends in the bed-plates and at their upper ends in the top plates 21. The rear shafts 68$^b$ and 68$^c$ are provided near their lower ends with beveled gears 68$^a$, which mesh with bevel-gears 69, Fig. 5, upon the main drive-shaft, and thereby impart motion to the carrier-chains. In addition the shaft 68$^c$ carries a sprocket-wheel 70, by means of which motion is transmitted to the sprocket-wheel 33 upon the shaft 32 of the cutting-disk, while the shaft 68$^b$ carries a like sprocket-wheel 71, which transmits motion through a sprocket-chain 72 to a sprocket-wheel 73, which revolves the packer-shaft 74 through the medium of a clutch 75.

The packer-shaft passes through the top board 21 and gives motion to three packer-chains 77, located at different heights, each provided with suitable packer-teeth 80. The lower chain passes over sprocket-wheels 78 on the shafts 74 and a sprocket-wheel mounted on the shaft 68$^b$. The middle one passes over a sprocket 76 on top of the packer-shaft and a sprocket-wheel 81, which is secured upon a hollow shaft 82, Fig. 5, sleeved upon an upper extension of the shaft 68$^b$. The upper packer-chain is carried by a sprocket-wheel 83 upon the hollow shaft 82 and passes around an idler-sprocket 84. For the protection of the two upper packer-chains there are provided shields 79 85, Fig. 5, suitably secured to the frame.

The cornstalks are prevented from clogging the carrier-chains, wheels, and other parts by means of flexible steel aprons 86 87, Figs. 1, 2, 5, and 16, which extend between the front and rear uprights 22 23 of the superstructure and form a passage or throat between them through which the cornstalks are carried by the teeth of the carrier-chains. Each apron is attached rigidly at its rear end to the upright 23 on its side and extends in vertical direction from the top board to within a few inches of the bed-plate. The forward end of the inner apron 86 is rigidly attached to the upright 22 on its side, Figs. 16 and 17, but that of the outer apron 87 is attached to the free end of springs 88, which are attached to the upright 22, and curving around it are riveted at their free ends to the back of apron. These springs also serve to guide the cornstalks into the machine. The outer apron 87 is also supported from above the springs 88, and both aprons are provided with openings 89 for the teeth of the carrier-chains to project through, Fig. 2. These openings are protected from above by overhanging flanges 90 and 91, Fig. 16, which are rounded off at their ends to provide for the gradual withdrawal of the carrier-teeth in passing around the sprocket-wheels. The flange 91 on the inner apron 86 is made of a separate piece and is held in its proper position by springs 92 and 93. Both aprons are also stayed at their backs by loops 94 across the openings. By examining Figs. 1 and 17 it will be seen that these aprons and flanges form spring-pressed walls for the throat or feed-passage of the corn through the machine to the binding mechanism.

The front wheels 12 of the harvester are provided with means for raising and lowering them. To this end each wheel revolves upon a stub-shaft 99, which is secured in a yoke 100, Figs. 2 and 9, the ends of which are pivotally secured in the axis of the main shaft. This yoke is rearwardly inclined and adjustably held in position by a cable 101, which winds around a drum 102 upon a shaft 103, extending across the frame and carrying the drum on the other side.

200 are springs sleeved over end of cable, and against which the ends of the yoke bear, forming the spring connection between the frame and the wheels. The face of the drum is spirally grooved and it slides on a feather on the shaft. To provide for the proper winding of the cable, I arrange a lug 201 on the bracket 202 (see Fig. 18) to engage in the spiral groove on the drum, and thus positively shift it to prevent overlapping of the coils of the cable. At a point near the center of the machine is keyed upon the shaft 103 a screw-wheel 104, which engages into a worm-wheel 104$^a$ upon a vertical shaft 105, Figs. 3 and 9. The latter extends far enough above the bed-plate to receive a beveled gear-wheel 106, Figs. 1 and 3, which meshes with a bevel-gear 107 on the actuating-rod 108, which terminates in a crank-handle (see Fig. 1) convenient for the driver on the seat, who by turning the handle can thus raise or lower the wheels, respectively, of the harvester-frame within the desired limits.

For gathering the cut cornstalks and binding them into bundles the following appliances are provided: The sprocket-wheel 73, Fig. 7, which gives motion to the packer-shaft is keyed upon a stub-shaft 110, Fig. 8, which is journaled at 111 in the bed-plate in line with the packer-shaft. It carries a gear-wheel 112, which meshes with a pinion 113. The latter is fast upon the stub power-shaft of binder 114 and carries below the bed-plate a sprocket-wheel 115, which conveys power through sprocket-chain 117 to the sprocket-rim 118, Fig. 9, which is loosely held by flanges upon the periphery of the main wheel 119 of binder and thus receives constant motion with the machine, while the binder-wheel 119 moves only when the binder is in operation. This main wheel of binder 119 is carried upon knotter-shaft 120 immediately under bed-plate in the box provided therefor, and is connected with crank 121 of needle-shaft 122, which actuates the needle-arm 123, through pitman 124, Figs. 10, 11, and 12, the needle-arm being at the top of the shaft, as shown in Fig. 7. Stepped upon stub-shaft 110, Figs. 7 and 8, and journaled in bracket 125, extending upward and forward from bed-plate, is the packer-shaft 74, which is connected with stub-shaft 110 through clutch 75. The sliding member of this clutch is carried by the forked end of a lever 126, which is fulcrumed in an opening of bracket 125 and engages with its free end in a cam 127 upon the needle-shaft 122, so arranged that as the needle-shaft is rocked forward it will throw the packer-shaft out of gear, allowing it to stand still while the needle is across the throat of the machine.

In lieu of providing packer-chains on both sides of the throat they are only on the outer side, and the other is provided with springs 130 131 132, Figs. 1, 3, and 7, for the purpose of pressing the cornstalks against the packer-chains, which carry them against and past spring 133, Fig. 7, which is attached to front end of a breastplate 134, and extends diagonally across the throat within the line traveled by the packer-chains and crossing the path of the needle-arm, from which point it curves in back to the breastplate, where its free end has a free sliding motion. The dotted lines in Figs. 10, 11, and 12 show the line of the throat.

A compressor or trip arm 140, Figs. 7, 10, 11, and 12, is carried by a rock-arm 141, which is loosely sleeved upon a bolt 142. This bolt extends in close proximity to the needle-shaft from the top board 21 to the journal-block 143, which forms the upper bearing of needle-shaft. The compressor or trip arm has a sliding connection with the rock-arm 141 by means of two antifriction-rollers 144 145, Figs. 12 and 15, which engage into a groove formed in lower side of the compressor or trip arm 140. These antifriction-rollers are secured upon a plate 146, which is adjustably secured by a bolt 147 to the rock-arm 141. The rock-arm 141 is retained in position upon the bolt by flanges 148, projecting above and below the needle, Fig. 8. The compressor or trip arm is pivotally secured at 150 to a sliding connecting-bar 151, the free end of which passes through a socket formed in a rock-arm 152, in which it has a limited play by means of a pin and slot, and a spring 153, sleeved upon the connecting-bar 151, constitutes the yielding support of the compressor-arm. The rock-arm 152 is fast upon the trip-shaft 154, the lower end of which is provided with a crank 155, into which one end of a connecting-rod 156 is hooked. This connecting-rod slides through a link 157 and carries a compressor-spring 158, interposed between the link and the tension-adjusting nut 159. Near the farther end this connecting-bar carries the tripping-nut 160 of the binder-lock. The binder-lock, Figs. 13 and 14, consists of a friction-dog 161, pivotally secured at 162 upon the main binder-wheel and of tripping-latch 163, which is loosely supported upon two pins 164 in the raised box 165 on the bed-plate. The latch 163 is adapted to engage with its lower edge against a raised flange 166, and thereby hold the dog 161 out of frictional engagement with the rim of the binder-wheel. The latch is provided with a beveled heel extension 167, which projects into the path of the tripping-nut 160, and, with a spring 168, adapted to hold the trip-latch in the normal position shown in Fig. 13. The tripping-nut is provided with a slot 169 and with a beveled shoulder 170. The tripping-dog is provided with a flange, part of which forms an incline 171 and the other a recess 172. The outer face 173 of the dog is adapted to fit against the face of the flange 174. As the projection 167 is struck by the under bevel-face of the block 160 it will be depressed and thereby rock the catch 163 upon the outer pin 164, raising the inner end thereof above the flange 166 of the dog 161, and thereby allow the spring of the dog 161 to force the latter back. The tilted position of the latch 163 is shown in dotted lines in Fig. 13.

To the rear end of the link 157, Figs. 10, 11, and 12, is pivotally secured one end of the walking-lever 180. This lever is placed on the upper face of the base-plate 16 and is pivoted thereto by a pivot 181. The connecting-pin between the frame 15 and the walking-beam passes through a curved slot 180ª, formed in the plate 16. (See Fig. 4.) The opposite ends of the walking-beam carry an antifriction-roller 182, the same being connected therewith by a suitable journal which passes through a curved elongated slot 182ª, formed in the plate 16. The antifriction-roller 182 is located below the plate 16 and travels in a cam-groove 183 in the main binder-wheel 119.

The knotter-shaft 120 has secured upon it the discharge-arms 184 for throwing the bundle out of the binder at the proper time into the rack where the shock is formed.

In practice the parts, being constructed and arranged as shown and described, are intended to operate as follows: As far as the device for cutting the cornstalks is concerned, the operation is the same as for cutters of similar character and need not be further described.

As far as the device for cutting the cornstalks is concerned, it will be seen that the cut cornstalks are carried by the packer-chains into the throat of the machine against the compressor-arm, the parts being as shown in dotted lines in Fig. 9, and as the bundle accumulates the pressure on the compressor-arm increases and at the proper time the tripping-arm is rocked backward and outward upon a radius with the bolt 142 as a center against the pressure of the spring 153, the parts then being as in Fig. 10. As soon as the connecting-bar has reached its limit of movement in the socket in the rock-arm 152 the further pressure of the corn rocks the tripping-shaft 154, and thereby compresses the spring 158 and carries the tripping-nut 160 from its normal position (shown in Fig. 9) into the position shown in Fig. 10, thereby engaging with its beveled shoulder 170, Figs. 13 and 14, the upper bevel-face of the heel 167 of the tripping-latch and disengaging the latter (by turning it upon the outer one of the pins 164) from the flange 166 of the tripping-dog. The latter is then forced outward by a small spring 185 and engages with the moving rim of the binder-wheel and communicates motion to said wheel. This communicates the proper motion to the needle-arm, as in the usual manner, and at the same time trips the clutch on the packer-shaft, thereby causing the packer-chains to stand still. At the same time, as the binder-wheel makes its revolution, motion is imparted to the knotter-shaft 120 and to the walking-lever 180. When the cam end of the walking-lever is brought to the first rise in the cam-groove 183, it throws the cam end of the walking-lever to the periphery of the binder-wheel and carries the link 157 and connecting-rod 156 in the opposite or return direction, thus rocking the tripping-shaft sufficiently to carry the compressor or trip arm back on its anti-friction-rollers and out of the way of the bundle, as shown in Fig. 12. At the same time the discharge-arms force the bundle, which has now been bound in the usual manner, out of the throat of the machine into the rack. At this moment the walking-lever approaches the second rise in the cam-groove, which carries it back to its original position near the center of the binder-wheel, thereby carrying the link and its attached parts back to their normal position. It will be seen that during such movement the tripping-nut in being brought back passes under the heel of the tripping-dog, (see Fig. 14,) allowing the same to remain in position to do its work by engaging against the flange 171 and tripping the dog as soon as one revolution is complete. During the backward movement of the block 160 the upper face of the shoulder 167 is engaged by the under face of the block, and thereby the latch 163 is tilted into the position shown in dotted lines, Fig. 13. When in this position, the flange 166 will pass below the latch. The extent of the upward movement of the inner end of the latch is governed by the vertical width of the inner slot in the latch and by the relative position of the outer pin 164 and the outer edge of the plate 161 and its flange 166, as shown in Fig. 13, the upward movement of the latch being sufficient to clear the flange 166. The engagement of the locking-latch into the recess 172 prevents the binder from being turned or jarred backward when not in use.

I have omitted to describe or show the knotter mechanism, as I intend to use any of the known devices for that purpose. As the relation of the parts for binding is the same as in the ordinary well-known harvesters it will be seen that no specific arrangement of knotter is required.

It will be seen by reference to Fig. 7 that the needle-arm and the compressor are adjustably secured to their respective shafts, so that they may be adjusted to bind the bundle at any desired point. This adjustment is acquired by removing the pins shown, lowering the members, and finally inserting the pins in the openings in the shafts near the frame 21. This I consider an important advantage, although it is not necessary.

By examining Figs. 10, 11, and 12 it will be seen that the compressor-arm is withdrawn from in front of the bundle by a lateral movement which shifts the arm endwise, so that as soon as the bundle has been moved beyond the end of the arm it may be shifted in again behind the incoming corn. This greatly reduces the distance required to move the bundle by the discharge-arms in ejecting it, shortens the required platform, and cheapens and simplifies the machine.

What I claim as my invention is—

1. In a harvesting-machine, the combination with the associated parts of a machine, comprising binding mechanism, of a compressor-bar, a pivotal support therefor, a sliding connection between the support and bar a compressor-arm pivotally supported on the bar, an additional support for the arm, independent of the pivotal support loosely engaging therewith, and means for actuating the pivotal support, substantially as described.

2. In a corn-harvester, the combination with the wheeled frame and its cutting mechanism, of a stubble-cutter comprising a blade arranged obliquely to the line of motion and below the plane of the cutting mechanism, a shaft to which the blade is secured, journaled in bearings in the frame and vertically adjustable therein, a lateral extension on the shaft, and fastening means engaging the extension to hold the shaft from turning and in its adjusted position, substantially as described.

3. In a corn-harvester, the combination with the wheeled frame and its cutting mechanism, of a stubble-cutter comprising a blade arranged obliquely to the line of motion beneath the cutting mechanism, the shaft 40 to which the forward end is secured, journaled in vertical bearings in the frame, and vertically adjustable therein, the arm 41 on said shaft and the breakable pin for holding said arm from turning, substantially as described.

4. In a corn-harvester, the combination with the ground-wheels, of a main drive-shaft for the actuated devices a drive connection therefor from the ground-wheels, and a clutch on the main drive-shaft for connecting it with the ground-wheels comprising a collar 49, the actuating-rod 52 therefor having a yielding angular section engaging the collar, and devices in proximity to the driver for shifting said rod, substantially as described.

5. In a corn-harvester, the combination with two vertical uprights arranged at or near the front of the frame, rear uprights, aprons secured to the rear uprights a flexible connection between one of the aprons and one of the forward uprights, a rigid connection between the other forward upright and apron, guide-flanges 91 passing through the fixed apron, springs at opposite ends of said flanges, and carrier-chains projecting through openings in the aprons and extending parallel therewith, substantially as described.

6. In a corn-harvester, the combination with the frame of vertically-disposed guide-aprons having apertures therein a series of fixed flanges on one apron, a series of spring-supported flanges passing through the apertures in the other apron, and a yielding connection between one of the aprons and its support, substantially as described.

7. In a corn-harvester, a raising and lowering device for the frame comprising the yokes pivoted at one end to the frame, the ground-wheels supported intermediate the ends, a cable secured to the outer ends and secured to a spirally-grooved winding-drum sliding on a feather on its shaft, and a lug engaging the groove in the drum to shift it laterally and cause the cable to wind properly, substantially as described.

8. In a corn-harvester, the combination of the frame, the yokes pivoted at one end to the frame, the ground-wheels supported thereon, the cables secured to the ends of the yokes, the winding-drums having spiral grooves, the shafts 103 to which said drums are slidingly feathered, the bracket 202, the lug 201, thereon engaging the spiral groove on the drum, and connections extending into proximity to the operator for actuating the shaft 103, substantially as described.

9. In a corn-harvester, the combination with the binding mechanism, of the needle-arm and the knotter-shaft, a drive connection therefor comprising the sprocket-ring 118 driven from a drive-shaft, the binder-wheel 119 on the knotter-shaft on which said ring turns, a tilting binder-lock to connect the ring to the wheel, and a swinging compressor-arm controlling said lock, substantially as described.

10. The combination of the binder-wheel 119, the drive-rim thereof, the binder-lock for connecting the rim to the wheel consisting of the horizontally-swinging dog 161 pivoted on the binder-wheel, the tripping-latch 163, the spring 165, and devices for tripping the latch, substantially as described.

11. The combination of the binder-wheel 119, the driven rim thereof, the dog 161 pivoted on the binder-wheel, the spring for the dog, the flange on the dog having incline 171 and recess 172, the latch 163, adapted to engage in the recess, and the devices for tripping the latch, substantially as described.

12. In a corn-harvester, the combination with the associated parts of a machine, comprising a binding mechanism, of a compressor-arm, a supporting-bar therefor, a pivotal sliding support for the bar, an additional sliding support for the arm, arranged opposite to and independent of the pivotal support and means for actuating the arm, substantially as described.

13. In a corn-harvester, the combination with the associated parts of a machine, comprising binding mechanism, of a compressor-arm, a supporting-bar therefor, an oscillating support for the arm, arranged in advance thereof and independent of the supporting-bar and means for moving the arm into and out of the path of the corn, substantially as described.

14. The combination in a corn-harvester of the shaft or bolt 142, the bracket 141 thereon, the rollers 144, 145 thereon, the compressor-arm slotted to receive said rollers, the connecting-bar 151, the socketed rock-arm 152 secured to the trip-shaft and in which it has a limited play, and a connection from the trip-shaft to the binder-lock, substantially as described.

15. The combination in a corn-harvester of the shaft or bolt 142, the bracket 141 thereon, the rollers 144, 145 thereon, the compressor-arm slotted to receive said rollers the connecting-bar 151, the socketed rock-arm 152 secured to the trip-shaft and in which it has a limited play, the spring 153 between a nut on the bar 151 and the rock-arm, and a connection from the trip-shaft to the binder-lock, substantially as described.

In testimony whereof I affix my signature in presence of two witnesses.

WILLIAM T. HARRIS.

Witnesses:
 E. P. HOOKER,
 W. H. McCLINTOCK.